(12) United States Patent
Pinding

(10) Patent No.: US 8,244,816 B2
(45) Date of Patent: Aug. 14, 2012

(54) SYSTEM AND METHOD FOR CONTROLLING REGULARITY OF PRESENCE STATUS TRANSMISSION BASED ON RESOURCE USAGE OF A USER TRANSMITTING NODE

(75) Inventor: Armo Pinding, Tallinn (EE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 12/584,990

(22) Filed: Sep. 14, 2009

(65) Prior Publication Data

US 2011/0066688 A1 Mar. 17, 2011

(51) Int. Cl.
*G06F 15/16* (2006.01)
(52) U.S. Cl. ........ 709/206; 709/204; 709/224; 709/226; 715/752; 715/758
(58) Field of Classification Search .................. 709/204, 709/206, 223–224, 226; 715/752, 753, 758
See application file for complete search history.

(56) References Cited

U.S. PATENT DOCUMENTS

| 7,769,017 | B2 * | 8/2010 | Sylvain | 709/227 |
| 8,060,105 | B2 * | 11/2011 | Jung et al. | 455/452.2 |
| 2006/0120281 | A1 * | 6/2006 | Schmidt et al. | 370/223 |
| 2007/0025270 | A1 * | 2/2007 | Sylvain | 370/254 |
| 2008/0253393 | A1 * | 10/2008 | Blackburn et al. | 370/468 |
| 2009/0003362 | A1 * | 1/2009 | Pattabhiraman et al. | 370/401 |
| 2009/0022101 | A1 * | 1/2009 | Min et al. | 370/329 |
| 2009/0089804 | A1 | 4/2009 | Beadle et al. | |
| 2009/0254648 | A1 * | 10/2009 | Childress et al. | 709/223 |
| 2010/0042691 | A1 * | 2/2010 | Maguire | 709/206 |
| 2010/0202415 | A1 * | 8/2010 | Ansari et al. | 370/336 |
| 2011/0055369 | A1 * | 3/2011 | Oh et al. | 709/224 |
| 2011/0064074 | A1 | 3/2011 | Kreitzberg et al. | |

FOREIGN PATENT DOCUMENTS

EP 1441486 A2 * 7/2004

OTHER PUBLICATIONS

"Non Final Office Action", U.S. Appl. No. 12/584,989, (Apr. 2, 2012), 16 pages.

* cited by examiner

*Primary Examiner* — Oanh Duong
(74) *Attorney, Agent, or Firm* — Wolfe-SBMC

(57) ABSTRACT

A method, program and user node for use in a communication system implemented over a network comprising a plurality of user nodes, each being associated with a respective presence status indicating an availability of the user node for communication within the communication system. The method comprises, at each of a first one or more of the user nodes: transmitting repeated presence messages to each of a plurality of others of the user nodes, each of the presence messages comprising at least one of: a request for the presence status of the other user node, and a notification of the presence status of the first user node; determining a measure of resource usage in relation to at least one of the first user node and the other user nodes; and controlling a regularity of the repeated transmission of presence messages in dependence on the determined measure of resource usage measure.

28 Claims, 5 Drawing Sheets

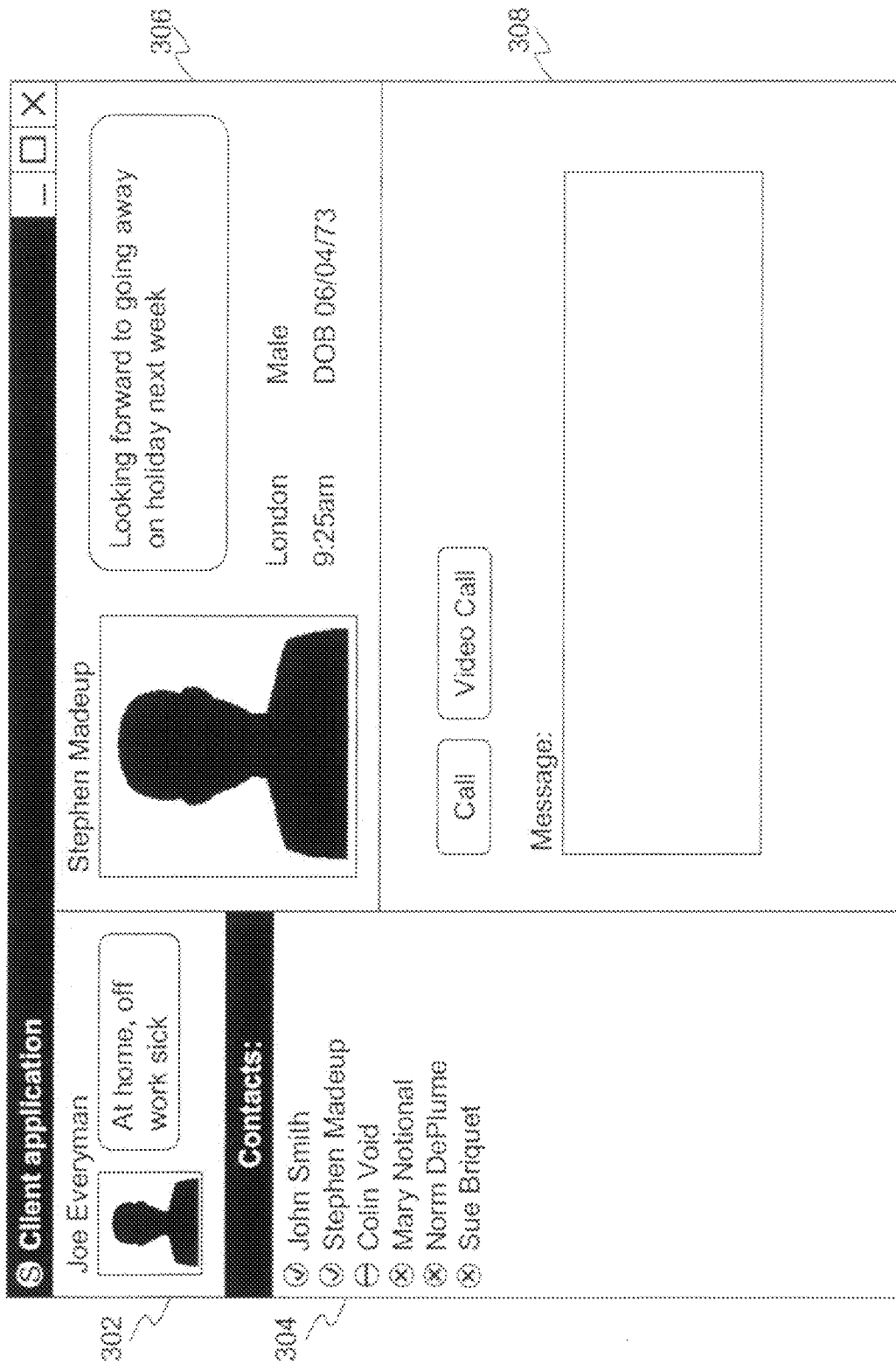

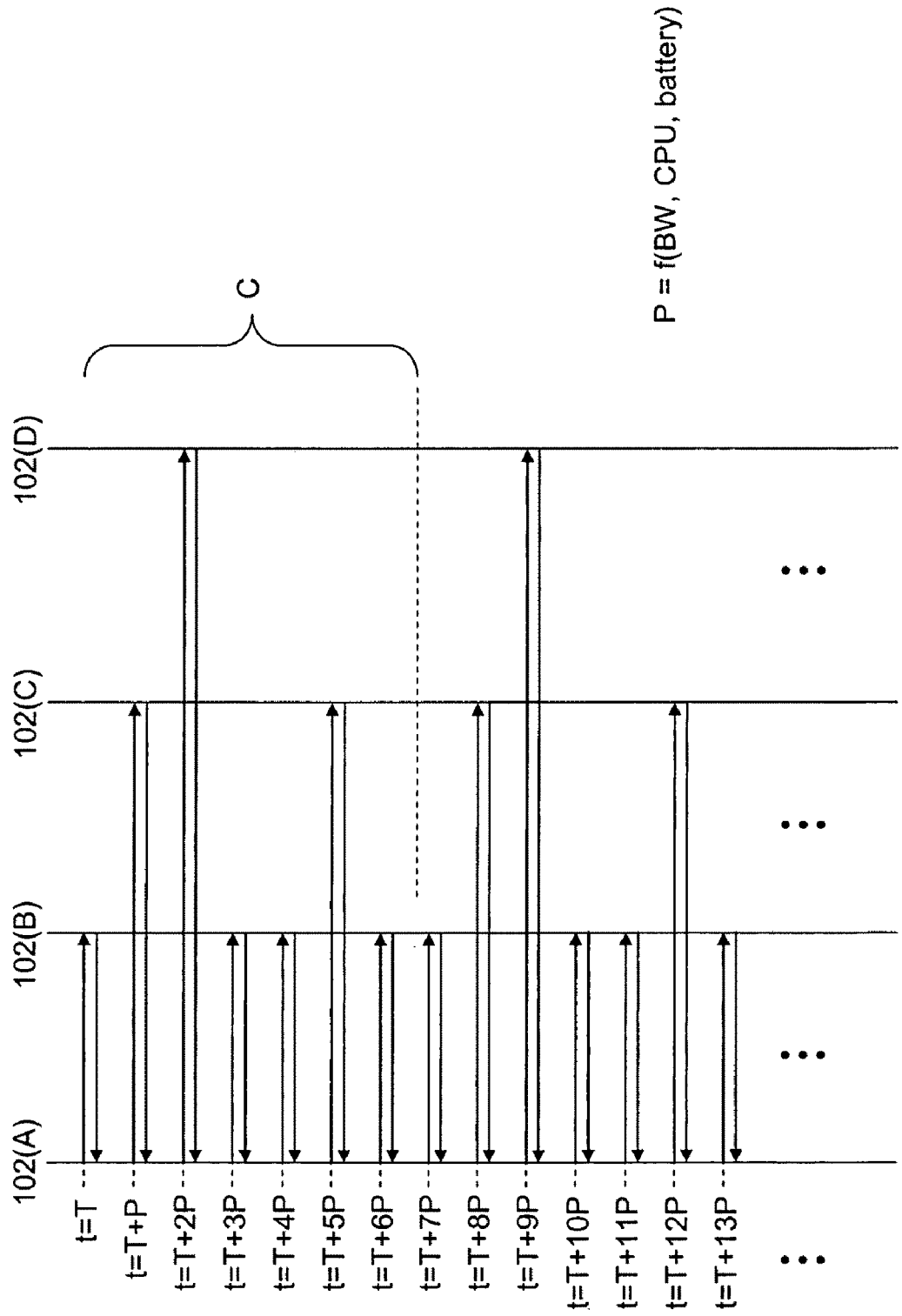

SYSTEM AND METHOD FOR CONTROLLING REGULARITY OF PRESENCE STATUS TRANSMISSION BASED ON RESOURCE USAGE OF A USER TRANSMITTING NODE

FIELD OF THE INVENTION

The present invention relates to communicating a presence status between nodes of a communication system.

BACKGROUND

Some communication systems allow the user of a device, such as a personal computer, to communicate across a packet-based computer network such as the Internet. Such communication systems include voice over internet protocol ("VoIP") systems. These systems are beneficial to the user as they are often of significantly lower cost than conventional fixed line or mobile networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital authentication certificates, without using a server for those purposes. Further details of an example P2P system are disclosed in WO 2005/009019.

VoIP or other packet-based communications can also be implemented using non-P2P systems that do use centralized call set-up and/or authentication, e.g. via a server.

In addition to the primary user content—e.g. the voice or video call, IM chat messages or file transfer, etc.—various other data may need to be communicated throughout the P2P or other communication system. For instance, a client may up- or download contact lists and/or "avatar" images to or from a server (avatar images are images chosen by the users to represent themselves graphically to others of the communication system). Further, the client itself may need to autonomously communicate status information with another client. One example of this occurs when clients need to share presence information. Presence is an availability status of the user in question, preferably defined in part by that user themselves. For example, presence status may indicate that the user is offline, that the user is online and available, or that the user is online but has selected to be shown as unavailable ("do not disturb").

SUMMARY

Generally in the art it tends to be thought that the main concern in saving on the network resources incurred by a communication system is the primary user content, such as the voice or video call, or IM chat messages or file transfer, etc. However, the inventors of the present invention have identified that, from amongst the various other data that may be communicated throughout a communication system, presence updates can also have a substantially deleterious effect on the network resources incurred by the system.

For example, a presence process may begin by searching for contacts' network addresses, and then, once the search reply comes back, sending a status request command to the specified addresses of each contact in the contact list. If a contact is online, it responds with a reply indicating its status. If no reply is received, the contact is deemed to be offline. Such a presence process is typically repeated many times throughout the operation of each client in the system, e.g. with each client periodically polling all of its contacts, thus incurring significant network resources. Other presence processes may also be significantly burdensome due to the requirement to constantly keep track of each contact's status in an approximation of real time.

It would therefore be advantageous to find an improved presence process that would make more efficient use of the available resources.

According to one aspect of the present invention, there is provided a method for use in a communication system implemented over a network comprising a plurality of user nodes, each being associated with a respective presence status indicating an availability of the user node for communication within the communication system; the method comprising, at each of a first one or more of the user nodes: transmitting repeated presence messages to each of a plurality of others of said user nodes, each of said presence messages comprising at least one of: a request for the presence status of the other user node, and a notification of the presence status of the first user node; determining a measure of resource usage in relation to at least one of the first user node and said other user nodes; and controlling a regularity of said repeated transmission of presence messages in dependence on the determined measure of resource usage.

In embodiments, the method may comprise maintaining a contact list specifying a selection of contacts from said plurality of user nodes, wherein said plurality of other user nodes are a plurality of said contacts.

The transmission of said presence messages may be periodic such that a presence message is transmitted once per period, and the control of said regularity may comprise controlling said period in dependence on the determined measure of resource usage.

Said measure of resource usage may be in relation to at least the first user node.

Said measure of resource usage may be in relation to at least one of the other user nodes.

Said measure of resource usage may at least comprise a measure of uplink bandwidth of the respective first or other user node.

Said measure of resource usage may at least comprise a measure of resource usage comprises at least a measure of downlink bandwidth of the respective first or other user node.

Said measure of resource usage may at least comprise a measure of CPU usage of the respective first or other user node.

Said measure of resource usage may at least comprise a measure of battery level of the respective first or other user node.

The method may further comprise associating a presence update priority level with each of the contacts, wherein the transmission of said presence messages may comprise transmitting the presence messages in an order dependent on the respective presence update priority level for each contact.

The communication system may comprise a VoIP system. The communication system may comprise a peer-to-peer system.

According to another aspect of the present invention, there is provided a computer program product for use in a communication system implemented over a network comprising a plurality of user nodes, each being associated with a respective presence status indicating an availability of the user node for communication within the communication system; the program comprising code embodied on a computer-readable medium and being configured so as when executed on a first one or more of the user nodes to: transmit repeated presence messages to each of a plurality of others of said user nodes, each of said presence messages comprising at least one of: a request for the presence status of the other user node, and a notification of the presence status of the first user node; determine a measure of resource usage in relation to at least one of the first user node and said other user nodes; and control a regularity of said repeated transmission of presence messages in dependence on the determined measure of resource usage.

In embodiments, the program may be further configured in accordance with any of the above method features.

According to another aspect of the present invention, there is provided a first user node for use in a communication system implemented over a network comprising a plurality of user nodes, each being associated with a respective presence status indicating an availability of the user node for communication within the communication system; the first user node comprising: a processing unit; and a transmitter, coupled to the processing unit, and configured to operate in conjunction with the processing unit in order to transmit repeated presence messages to each of a plurality of others of said user nodes, each of said presence messages comprising at least one of: a request for the presence status of the other user node, and a notification of the presence status of the first user node; wherein the processing unit is configured to determine a measure of resource usage in relation to at least one of the first user node and said other user nodes, and is further configured to control a regularity of said repeated transmission of presence messages in dependence on the determined measure of resource usage.

In embodiments, the processing unit and transmitter may be configured in accordance with any of the above method features.

According to another aspect of the present invention, there is provided a communication system implemented over a network, the communication system comprising a plurality of user nodes, each being associated with a respective presence status indicating an availability of the user node for communication within the communication system; wherein each of the first user nodes comprises: a processing unit; and a transmitter, coupled to the processing unit, and configured to operate in conjunction with the processing unit in order to transmit repeated presence messages to each of a plurality of others of said user nodes, each of said presence messages comprising at least one of: a request for the presence status of the other user node, and a notification of the presence status of the first user node; wherein the processing unit is configured to determine a measure of resource usage in relation to at least one of the first user node and said other user nodes, and is further configured to control a regularity of said repeated transmission of presence messages in dependence on the determined measure of resource usage.

BRIEF DESCRIPTION OF THE DRAWINGS

For a better understanding of the present invention and to show how it may be carried into effect, reference will now be made by way of example to the accompanying drawings in which:

FIG. 3 is a schematic representation of a P2P client application user interface viewed on a user terminal;

FIG. 5 is a signalling chart illustrating a presence update process.

DETAILED DESCRIPTION OF PREFERRED EMBODIMENTS

Figure 1:
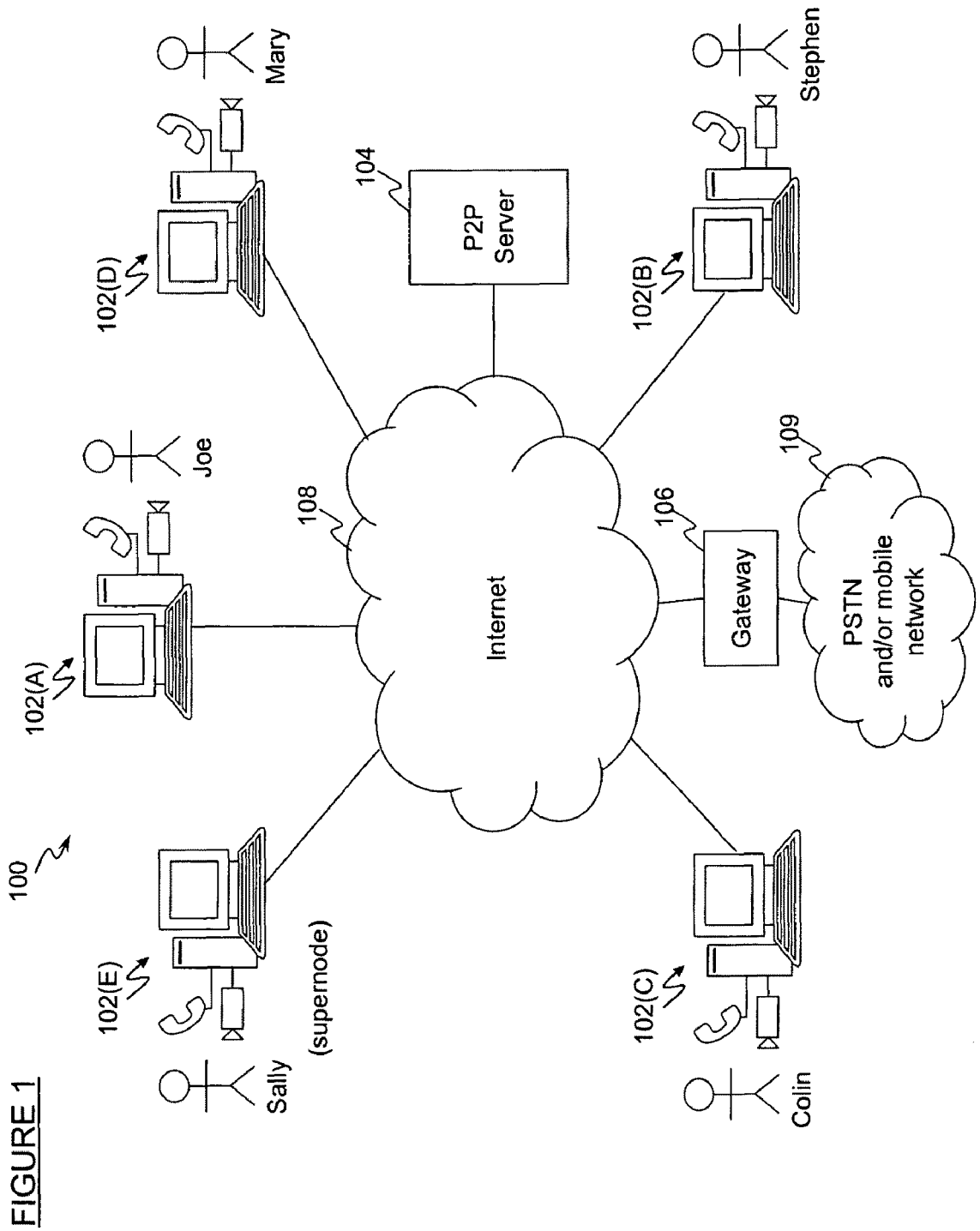
FIG. 1 is a schematic representation of a packet-based network such as the Internet.

FIG. 1 is a schematic illustration of a communication system 100 implemented over a packet-based network such as the Internet 108 comprising a plurality of interconnected elements. Each network element is connected to the rest of the Internet 108, and is configured to communicate data with other such elements over the Internet by transmitting and receiving data in the form of Internet Protocol (IP) packets. Each element also has an associated IP address locating it within the Internet, and each packet includes a source and destination IP address in its header. The elements shown explicitly in FIG. 1 are: a plurality of end-user terminals 102(A) to 102(E) such as desktop or laptop PCs or Internet-enabled mobile phones; a server 104 of an Internet-based communication system; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

In order to communicate with another client, the initiating client needs to know the IP address of the terminal 102 on which the other client is installed. Therefore a process of address look-up is required.

Some Internet-based communication systems are managed by an operator, in that they rely on one or more centralized, operator-run servers for address look-up (not shown). In that case, when one client is to communicate with another, then the initiating client must contact a centralized server run by the system operator to obtain the callee's IP address.

In contrast to these operator managed systems, another type of Internet-based communication system is known as a "peer-to-peer" (P2P) system. The idea behind peer-to-peer (P2P) systems is to devolve responsibility away from centralized operator servers and into the end-users' own terminals. In the least, this means responsibility for address look-up is devolved to end-user terminals like those labelled 102(A) to 102(E) in FIG. 1. Each user terminal 102 runs a P2P client application, and each such terminal forms a node of the P2P system. P2P address look-up works by distributing a database of IP addresses amongst some of the end user nodes such as 102(D) and 102(E). The database is a list which maps the usernames of all online or recently online users to the relevant IP addresses, such that the IP address can be determined given the username. Details of creating a suitable distributed address look-up database will be familiar to a person skilled in the art.

In addition to address look-up, a supplier of the P2P client application may choose to provide some additional, secondary features which in contrast to address look-up may involve a server 104. One such function is the distribution of authentication certificates which are supplied from the server 104 to the user terminals 102 when they first register with the P2P system. After initial registration, the users' clients can then exchange the certificates in order to authenticate each other without further involvement of a server. Further details on the use of digital certificates for authentication in an exemplary P2P system can be found in WO 2005/009019. The P2P server 104 may also be used to provide some other secondary features in relation to a P2P network, such as to host contact lists and/or "avatar" images (images chosen by the users to represent themselves graphically to others of the P2P network). Nonetheless, the primary function of address look-up is still handled in a distributed fashion by end-user nodes, not by a server.

Once known, the address allows a user to establish a voice or video call, or send an IM chat message or file transfer, etc. Additionally however, the address may also be used when the client itself needs to autonomously communicate information with another client. One example of this occurs when clients need to share presence information. Presence is an availability status of the user in question, preferably defined in part by that user themselves. For example, presence status may indicate that the user is offline, that the user is online and available, or that the user is online but has selected to be shown as unavailable ("do not disturb").

Generally, the presence process starts with searching for contacts' network addresses in the P2P network. When the presence module in the client requests a search, the query is sent to the distributed database. Once the search reply comes back, the presence module sends a status request command to the specified address. If the contact is online, it responds with a reply indicating its status. If no reply is received, the contact is deemed to be offline.

So for example, referring to FIG. 1, if the client running on node 102(A) needs to know the presence status of node 102(C), then it looks-up the IP address of node 102(C) using the database distributed amongst end-user nodes 102, finds the required address on one of the user nodes such as 102(D) or 102(E), then uses that address to send a presence request directly over the Internet to node 102(A). If online, the node 102(A) replies with a response indicating the requested presence information.

Other presence processes not based on P2P are also possible, e.g. whereby the address look-up is performed by a centralized server, or the presence statuses themselves are stored and retrieved from some intermediate node such as a server. The following will be described in relation to a P2P system by way of example, but it will be understood that the teachings can be applied to other types of communication system.

Note also that, in preferred embodiments, there may in fact be no difference between presence status "requests" and "notifications" on a network level—preferably both include the sender's status and expect that receiver replies with its own in return. The only difference lies in scheduling, i.e. when and why it is determined to send a presence command. The term "presence command" or "presence message" may be used herein as an abstraction of status requests and/or notifications. A presence command may be sent either:
a) when the sender's own presence status changes and it needs to be communicated to others (which may be considered a "notification"); or
b) when the sender determines it is an appropriate time to poll a contact's presence status (which may be considered a "request"). This would preferably comprise a periodic polling, but could in principle also be triggered by other means.

In both cases the sender's presence command preferably contains the sender's own presence status and receives the other's presence status in response, so the presence statuses travel both ways. However, the option of distinct request and response messages is not excluded.

The constant exchange of presence commands required to keep users updated of their contacts' presences in some approximation of real time can place a not-insignificant burden on network resources, e.g. in terms of up- or downlink bandwidth or CPU processing resources one or more of the nodes involved such as the participating nodes or nodes implementing the distributed address database. To try to make best use of the available resources therefore, the present invention provides processes for prioritising the presence updates and/or varying their frequency or regularity. These will be described shortly, but for completeness an example client application is first described in relation to FIGS. 2 and 3.

Figure 2:
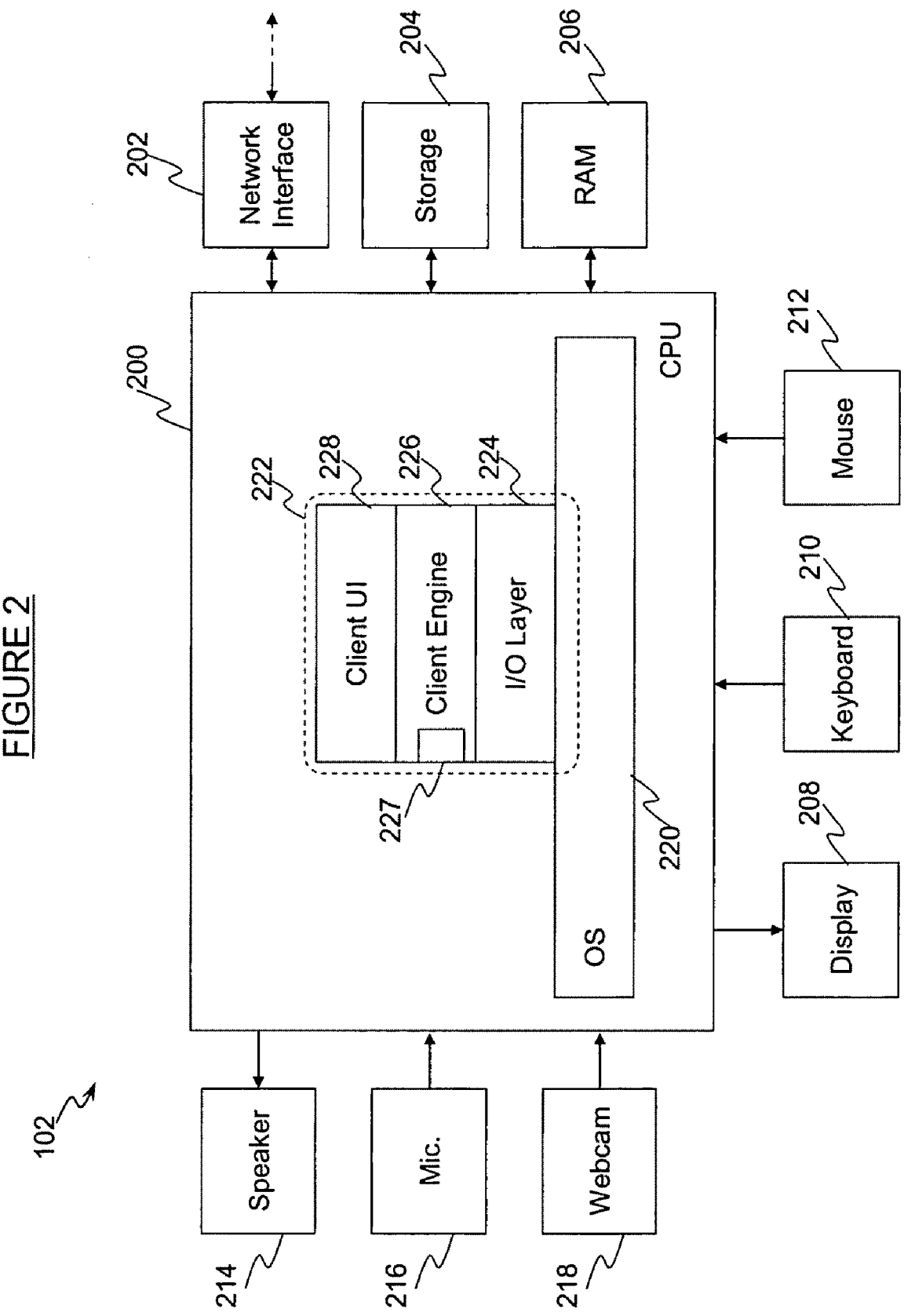
FIG. 2 is a schematic block diagram of a user terminal installed with a web-client application and P2P client application.

The schematic block diagram of FIG. 2 shows an example of an end-user terminal 102, which is configured to act as a terminal of a P2P system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 208, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P client application 222. On start-up or reset of the terminal 102, the operating system software 220 is automatically loaded into the RAM 206 and from there is run by being executed on the CPU 200. Once running, the operating system 220 can then run applications such as the P2P client application 222 by loading them into the into the RAM 206 and executing them on the CPU 200. To represent this schematically in FIG. 2, the operating system 220 and P2P client application 222 are shown within the CPU 200.

The P2P client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The P2P client application 222 is said to be run "on" the operating system 220. This means that in a multi-tasking environment it is scheduled for execution by the operating system 220; and further that inputs to the lowest (I/O) layer 224 of the P2P client application 222 from the input devices 202, 216 and 218 as well as outputs from the I/O layer 224 to the output devices 202, 208 and 214 may be mediated via suitable drivers and/or APIs of the operating system 220.

The I/O layer 224 of the P2P client application comprises a voice engine and optionally a video engine in the form of audio and video codecs which receive incoming encoded streams and decode them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine 226 preferably comprises a presence module 227 configured to retrieve presence information from the other clients of the users in the contact list by periodically polling them, e.g. using the mechanism described above, and reciprocally provide its own presence information to other clients. Exchange of presence information directly between clients is the preferred option, but alternatively the presence information could be exchanged via an intermediate node such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

FIG. 3 illustrates schematically an example user interface as would be presented to a user on the display 208 when the P2P client application 222 is open for viewing by the user. In this example, the user interface 228 is that of the P2P client application 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface displays a contact list of the user's friends or associates, these being other users of the P2P network. Entry in the contact list is preferably conditional on agreement from the users. The contact list may be stored at and retrieved from the P2P server by the client engine 226, so that the same list is available to the user uses different instances P2P client application on different terminals. Presence information is also displayed in the panel next to each contact. The presence information represents an availability status which preferably comprises an indication of whether the user is online, and preferably is in part user-defined. For example, the presence status may be: the user is offline (x), the user is online and has selected to be shown as available (√), or the user is online but has selected to be shown as not available (−).

A third panel 306 of the user interface displays the profile of a selected user from the contact list, in this case "Stephen Madeup", a user of another user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

In previous known systems, the more contacts a user had, then the less frequently the presence status of each contact was updated. This was because the presence process would have simply transmitted one presence command per fixed period, cycling through the contacts in a fixed order, such that the more contacts there were then the less often would a particular contact in the list cycle around to be polled in the current period. Alternatively the frequency for a given contact was made proportional to contact list length later. Proportional in this context meant that allocated resources (e.g. network bandwidth, polling frequency) were constant per contact (as opposed to constant for the whole contact list). Thus the more contacts a user had, the more traffic it generated (though it was capped at some point). So, for the client as a whole then resources incurred by the presence process grew linearly to a certain contact list length (and then stayed constant if the contact list grew beyond the cap).

According to a first aspect of the present invention on the other hand, there is provided a process whereby presence updates are prioritised differently for different contacts. Preferred embodiments of this first aspect of the invention are based around an estimation of how important a particular contact is for the user. When the user of the client 222 adds more and more contacts to the contact list 304, they usually do not actually call or contact all of them very often or in the same proportion. It is not rare that someone is added for just a short conversation, but remains there forever, thus contributing to an ever-growing contact list. Therefore in preferred embodiments, an estimation of how important a particular contact is for the user is used to prioritise updating presence information. The order and/or relative proportion in which presence commands are transmitted may then controlled such that presence information is updated more often for more popular contacts. This makes better use of available resources.

Furthermore, large contact lists previously created problems since there would have been a high number of status requests that need to be transmitted. This used an undesirable amount of CPU resources, bandwidth resources and/or battery resources of the terminal.

According to a second aspect of the present invention on the other hand, there is provided a process whereby the frequency or regularity of presence updates is varied in dependence on availability of resources. In preferred embodiments of this second aspect of the invention, an estimation of current resource availability is made, and this estimation is used to control the rate at which presence information is updated. Thus the frequency at which presence information is updated is made dependent upon the resource estimation. Limiting presence updates when there is limited resource availability can preserve resources, particularly during times when the user is not concerned with presence updates.

These first and second aspects of the invention may be applied either alone or in conjunction with one another.

Figure 4B:
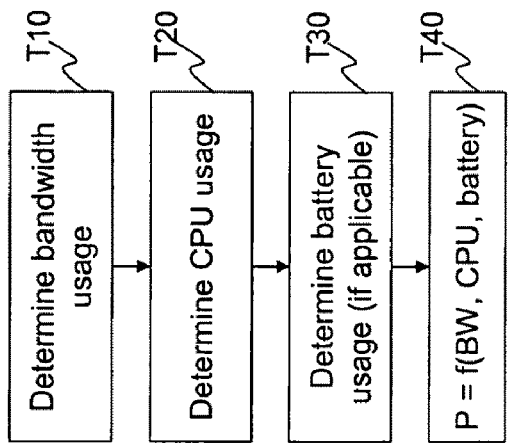
FIG. 4b is a flow chart illustrating another method for use in a presence update process.
Figure 4A:
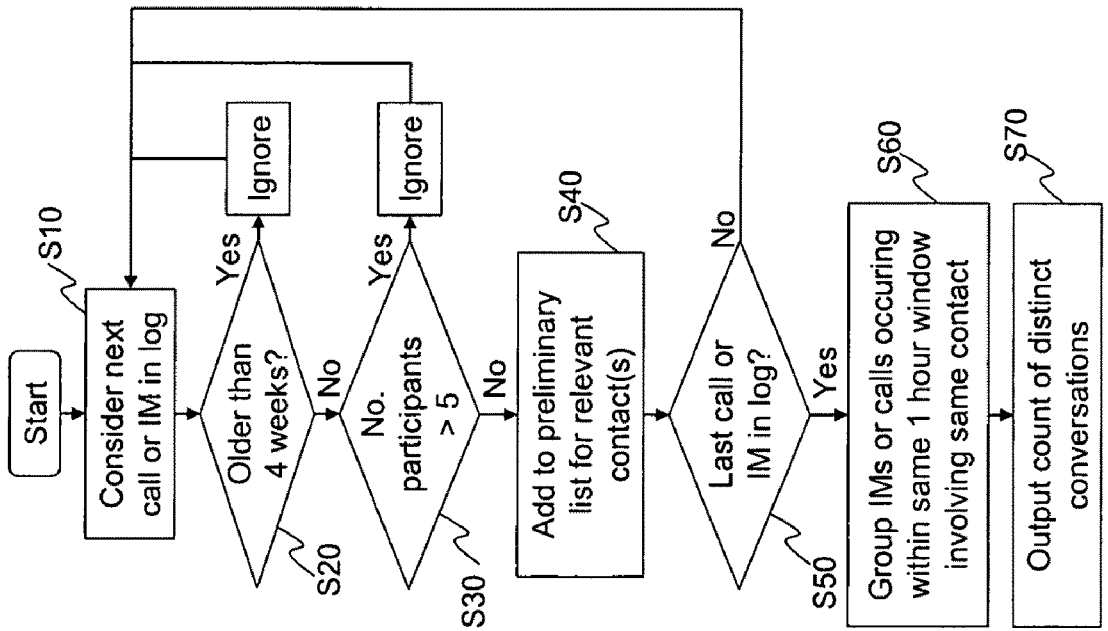
FIG. 4a is a flow chart illustrating a method for use in a presence update process.

An example of the first aspect of the present invention is described in relation to the flow chart of FIG. 4a. This describes an exemplary algorithm which may be implemented in the presence module 227 of the client engine 226.

The algorithm preferably places contacts in descending order according to an estimation of their popularity, based on an assumption that users care most about presence of those contacts with whom they hold conversations more often. The popularity therefore corresponds to some estimate of the likelihood of communication with the contacts, assuming that the user's future interest in the contacts is to some extent consistent with past events. Preferably, the following steps are performed by such an algorithm.

At step S10, the presence module 227 accesses a log of past calls and IM chat messages or sessions, which may be maintained by the client engine 226 in a memory 204 of the terminal 102 such as in a hard drive. Each entry corresponds to a particular communication event that might potentially be useful in determining the past popularity of a contact, and therefore the likelihood that the user will be interested in their presence for the purpose of communicating with them again in future. However, the entries are not necessarily all relevant, or not necessarily of equal relevance. The presence module 227 therefore considers each entry in turn to determine its relevance.

At step S20, for each successive entry in the log, the presence module 227 discards any entries older than a predetermined maximum, which in one particular embodiment is four weeks. This ensures that only recent chat and call history is taken into account. The maximum age is a parameter which may be chosen or adjusted to achieve compromise between stability and responsiveness. The shorter the period is the more responsive it is to newcomers; but on the other hand, the longer the period is, the more stable results it yields, thus not accidentally allowing newcomers to override contacts who are old friends.

At step S30, for each successive entry in the log, the presence module 227 discards any entries involving more than a maximum number of participants, which in one particular embodiment is five participants. Thus only those chats and calls (including multi chats and conference calls) are selected that have no more than the maximum members. This is because of an assumption that multi chats and conference calls with a large number of participants are impersonal and therefore should not contribute to the final popularity score.

If at either stage a log entry fails one of these tests, this means it is not considered relevant in terms of estimating popularity and the presence module 227 loops back to step S10 to consider the next entry in the log. If on the other hand the entry passes both tests, then at step S40 the presence module adds the entry to a preliminary list of relevant communication events for the participating contact or contacts. At step S50 the presence module 227 checks whether all entries in the log have been considered, and if not loops back to S10 to consider the next entry in the log.

Note though that steps S10-S50 need not necessarily be performed in the described loop of FIG. 4a. It would be equivalent to instead consider the age of all entries first, then move on to consider the number of participants of all remaining entries, or vice versa.

Once the preliminary count has thus been determined, the presence module 227 proceeds to step S60 where it groups together those consecutive chat messages and calls that occurred within a certain time window of one another, involving the same participant or participants, and counts each such group as a single event for the purpose of the final count. In one particular example the time window is one hour. The reason is because the algorithm tries to count "conversations", not their individual constituent pieces which is what separate IM chat messages (and calls respectively) may be. Calls and IM chat messages could be grouped together, or treated as separate groups. In the case of more than one participant, a criterion for grouping could be that all the participants of the IM chat session or call must be the same, or that only the contact under consideration need be the same. Either way, the grouping is done for each contact in the contact list.

Note that instead of determining a preliminary list of events first and then grouping them together as in Step S60, an alternative would be to count only the first occurrence of each event involving a particular contact within an hour, and then ignoring further occurrences involving the same contact within that hour.

Note also that certain parameters of the above steps can be changed to optimise the balance as appropriate to any particular system. Such parameters are:

Maximum age (preferably 4 weeks)
Maximum number of IM chat participants (preferably 5)
Maximum number of conference call participants (preferably 5)
Grouping time window (preferably 1 hour)

At step S70, the presence module determines a popularity score for each contact, which can be effectively considered an estimate of the likelihood of communication with each contact based on the counted past conversations. This may be done by adding the results of step S60 for each contact, such that the likelihood estimate is a measure such as the number of conversations with the respective contact in the last four weeks.

There is not necessarily any need to estimate a separate measure of likelihood: the count of past conversations itself (e.g. 29 times in four weeks) can be taken directly as an estimate of likelihood of communication and therefore of popularity. Alternatively however, a secondary measure could be derived, such as an average number of conversations per week or day, or a categorisation. For example, the presence module could categorise the popularity score as "high" for a certain upper limit such as more that 14 conversations in the last four weeks, "medium" for an intermediate number such as between 7 and 14 conversations in the last four weeks, or "low" for less then a certain lower limit such as fewer than 7 conversations in that time.

The presence module then prioritises presence updates with each contact based on the popularity score, preferably by controlling the order in which they are polled with presence commands.

Referring to FIG. 5, this preferably comprises controlling the relative proportion of times at which the different contacts are polled, in dependence on their popularity score. For example, say for illustrative purposes there are three contacts in the contact list corresponding to the users of three terminals 102(B . . . D) (there are likely to be many more contacts than this, but three is sufficient to illustrate the principle). Say then that the contact of 102(B) has a popularity score of "high", the contact of 102(C) has a popularity score of "medium", and the contact of 102(D) has a popularity score of "low". In this case, one presence request is transmitted per period P, but the presence module's decision as to which contact that presence command will poll depends on the determined order. That is, the presence module 227 on a polling terminal 102(A) may transmit presence requests in different proportions to each of the three terminals 102(B), 102(C) and 102(D), e.g. in a ratio of 4:2:1. Thus within an overall polling cycle C comprising a plurality of periods P, the presence module polls the presence four times per cycle for "high" popularity contacts, twice per cycle for "medium" popularity contacts, and once per cycle for "low" popularity contacts.

Alternatively or additionally, the presence module 227 may send presence requests in successive time order of their popularity level, so as to transmit presence request to the terminal(s) 102(B) of most popular contracts first in earlier periods, and to the terminal(s) 102(D) of least popular contacts last in later periods. This would mean that in the case of interruption then the presence information of the most popular contacts is most likely to be up to date, and that after start-up of the client 222 then the most popular contacts' presence will be updated the soonest.

Alternatively or additionally, the popularity score could affect the order in which presence requests from other terminals are serviced, so that if multiple requests are received in a short amount of time (compared to P) then the presence module 227 on the polled terminal 102(A) responds most promptly (i.e. soonest) to presence requests from the other terminal(s) 102(B) of contacts with the highest popularity score and least quickly to presence requests from the other terminal(s) 102(D) of contacts with the highest popularity score.

Alternatively or additionally, the popularity score could affect a relative superiority or hierarchy in determining which contact's terminal to transmit a presence command to in a particular period P, such that a presence command to a higher popularity contact can override or displace a command to lower popularity contact that would otherwise have been scheduled for that period P. For example if the terminal 102(A) transmits one presence command per period P, then a presence response request from a medium popularity terminal 102(C) may be allowed to displace a scheduled presence command scheduled to poll a less popular terminal 102(D), but not one scheduled to poll a more popular terminal 102(D).

Note that the prioritisation determined according to embodiments of the first aspect of present invention does not affect the frequency (1/P) at which presence commands are transmitted (though that possibility is not excluded). The frequency of presence commands is preferably controlled instead by a traffic limiter mechanism provided by embodiments of the second aspect of the present invention, discussed below. Nonetheless, the first aspect of the invention may be used advantageously in combination with the second aspect, since it allows presence propagation delay to remain low for important contacts even when presence traffic is suppressed (and less important ones will suffer in those situations).

An example of the second aspect of the present invention is described in relation to the flow chart of FIG. 4b. According to embodiments of the second aspect, the presence module 227 the rate or frequency at which presence commands are transmitted in dependence on available resources.

For example, referring to FIG. 4b, any or all of the following resources may be determined as in steps T10 to T30 (in any order) and used to control the frequency of presence updates at step T40.

At step T10, the presence module 227 determines a measure of bandwidth usage (BW) of the terminal 102(A) on which it is running, e.g. in terms of available kbps or percentage of total bandwidth. This may be reported directly from a resource manager function of the terminal 102(A); or may be inferred from client activity, e.g. if the user is on a call, receiving or transmitting a file, bandwidth availability is assumed to be low. The measure of bandwidth usage could include a measure of up- and/or downlink bandwidth.

At step T20, the presence module 227 determines a measure of available CPU resources of the terminal 102(A) on which it is running, e.g. in terms of current percentage CPU cycles being used. This may be reported directly from a resource manager function of the terminal 102(A); or may be inferred from client activity, e.g. if the user is on a call, receiving or transmitting a file.

At step T30, the presence module 227 determines a measure of battery resources (if applicable) of the terminal 102(A) on which it is running, e.g. in terms of percentage remaining battery level. This may be reported directly from a resource manager or the terminal 102(A).

The period P may additionally be dependent on other factors such as contact list length.

At step T40, the period P, or inversely frequency, at which presence commands are transmitted from the terminal 102(A) is determined according to some function f:

$$P = f(\text{BW}, \text{CPU}, \text{battery})$$

For example, $P = \alpha \cdot \text{CPU}/(\beta \cdot \text{BW} + \gamma \cdot \text{battery}) + C$ where $\alpha$, $\beta$ and $\gamma$ are multiplication parameters and C is another term such as a constant or a term dependent on the length of the contact list. The actual function f, or its parameters, is a design choice which will depend on the particular communication system in question and may be determined empirically or by simulation.

In the above, the terminal 102(A) whose transmission of presence commands is being controlled in dependence on resources is the same as the terminal whose resources are used to control that transmission. Alternatively or additionally however, the resources of other terminals involved in the presence polling process may be taken into account. For example, a presence module 227 running on another terminal 102(B) could report that it's resources are low and therefore it does not want to be periodically polled with presence commands.

It will be appreciated that the above embodiments are described only by way of example.

For instance, as well as calls and IM chat messages, the presence module 227 could take into account other types of communication events such as file transfers. Where calls are used to determine popularity, these could include voice and/or video calls.

Further, any method could be used to determine a priority level relating to likelihood of communication between a user and their contacts, which need not necessarily involve an automated process based on past popularity. In an alternative embodiment, the priority level could be user-assigned based on the user's own personal assessment of how likely they are to be interested in communicating with another contact in future, and therefore how relevant the presence of that contact is.

Further, rather than the priority level being used to determine the order in which presence messages are transmitted, the invention could alternatively or additionally result in a decision of whether or not to transmit presence message should be at all. For example, there could be some contacts that were last contacted so long ago, or who are contacted so infrequently, that presence updates should not be sent at all—in which case the sending a presence message to a contact in dependence on its presence update priority level comprises determining whether or not to send the message in dependence on the priority level.

The above has been described in terms of presence messages being transmitted with some period P, which may be variable. Generally speaking, the term "regularity" as used herein need not necessarily mean periodic, though that may be preferred. E.g. if presence messages are transmitted asynchronously or at unpredictable times, triggered by some occurrence or change of state, then the regularity could determine that the message is sent once every n occurrences or changes in state. Generally, the regularity could refer to any measure of occurrences or probability of transmitting a presence message per time.

Where regularity of presence messages is varied in dependence on resources, the resources need not be only those of the immediate terminal 102(A) on which the presence module 227 in question is operating, but could alternatively or additionally comprise the resource usage or other nodes such as resource usage reported by other user terminals 102 whose presence is being polled, and/or routing elements.

Although the above has been described mainly in terms of a peer-to-peer (P2P) system, the present invention is not specific to P2P and may be applied to any kind of packet-based communications system, such as more the centralised VoIP systems mentioned previously. Further, the present invention is not limited to use over the Internet, but could be implemented over any packet-based network.

Other configurations and applications of the present invention may be apparent to the person skilled in the art given the disclosure herein. The scope of the invention is not limited by the described embodiments, but only by the appended claims.

The invention claimed is:

1. A method for use in a communication system implemented over a network comprising a plurality of user nodes, the method comprising:
at each of the user nodes associating a respective presence status indicating an availability of said each of the user nodes for communication within the communication system;
at each of a first transmitting one or more of the user nodes, determining addresses for each of a plurality of others of said user nodes;
using the determined addresses, transmitting, by the first transmitting user node, repeated presence messages to said each of the plurality of others of said user nodes, each of the presence messages comprising at least one of a request for presence status of the other user nodes, and a notification of presence status of the first transmitting user node;
determining a measure of resource usage in relation to the first transmitting user node which carries out said transmitting step; and
controlling a regularity of said repeated transmission of presence messages in dependence on the determined measure of resource usage of the first transmitting user node which carries out said transmitting step, such that the repeated transmission of presence messages is dependent on the determined measure of resource usage of the first transmitting user node.

2. The method according to claim 1, comprising maintaining a contact list specifying a selection of contacts from said plurality of user nodes, wherein said plurality of other user nodes are a plurality of said contacts.

3. The method according to claim 2, comprising associating a presence update priority level with each of the contacts; wherein the transmission of said presence messages comprises transmitting the presence messages in an order dependent on the respective presence update priority level for each contact.

4. The method according to claim 1, wherein the transmission of said presence messages is periodic such that a presence message is transmitted once per period, and the control of said regularity comprises controlling said period in dependence on the determined measure of resource usage.

5. The method according to claim 1, wherein said measure of resource usage is in relation to at least one of the other user nodes.

6. The method according to claim 1, wherein said measure of resource usage at least comprises a measure of uplink bandwidth of the respective first or other user node.

7. The method according to claim 1, wherein said measure of resource usage at least comprises a measure of resource usage comprises at least a measure of downlink bandwidth of the respective first or other user node.

8. The method according to claim 1, wherein said measure of resource usage at least comprises a measure of CPU usage of the respective first or other user node.

9. The method according to claim 1, wherein said measure of resource usage at least comprises a measure of battery level of the respective first or other user node.

10. The method according to claim 1, wherein the communication system comprises a VoIP system.

11. The method of according to claim 1, wherein the communication system comprises a peer-to-peer system.

12. A computer program product for use in a communication system implemented over a network comprising a plurality of user nodes, the program comprising code embodied on a non-transitory computer-readable medium and being configured so as when executed on a first one or more of the user nodes to:
associate, at each of the user nodes, a respective presence status indicating an availability of said each of the user nodes for communication within the communication system;
determine addresses for each of a plurality of others of said user nodes;
using the determined addresses to transmit repeated presence messages to said each of the plurality of others of said user nodes, each of said presence messages comprising at least one of a request for presence status of the other user nodes, and a notification of presence status of the first user node;

determine a measure of resource usage in relation to the first user node which carries out said presence message transmission; and control a regularity of said repeated transmission of presence messages in dependence on the determined measure of resource usage of the first user node which carries out said presence message transmission, such that the repeated transmission of presence messages is dependent on the determined measure of resource usage of the first user node.

13. A first transmitting user node for use in a communication system implemented over a network comprising a plurality of user nodes, the first transmitting user node comprising:

a computer processor configured to associate a respective presence status indicating an availability of the first transmitting user node for communication within the communication system;

the computer processor configured to determine addresses for each of the plurality of others of said user nodes; and the computer processor configured to use the determined addresses to transmit repeated presence messages to each of the plurality of others of said user nodes, each of said presence messages comprising at least one of a request for presence status of the other user nodes, and a notification of presence status of the first transmitting user node;

wherein the computer processor is configured to determine a measure of resource usage in relation to the first transmitting user node, and is further configured to control a regularity of said repeated transmission of presence messages in dependence on the determined measure of resource usage, such that the repeated transmission of presence messages is dependent on the determined measure of the resource usage of the first transmitting user node.

14. The first user node of claim 13, wherein the computer processor is configured to maintain a contact list specifying a selection of contacts from said plurality of user nodes, wherein said plurality of other user nodes are a plurality of said contacts.

15. The first user node of claim 14, wherein the computer processor is configured to associate a presence update priority level with each of the contacts; and wherein the computer processor is configured to transmit the presence messages in an order dependent on the respective presence update priority level for each contact.

16. The first user node of claim 13, wherein the computer processor is configured to periodically transmit said presence messages such that a presence message is transmitted once per period, and the computer processor is configured to control said regularity by controlling said period in dependence on the determined measure of resource usage.

17. The first user node of claim 13, wherein the computer processor is configured to determine said measure of resource usage in relation to at least one of the other user nodes.

18. The first user node of claim 13, wherein the computer processor is configured to determine said measure of resource usage by determining at least a measure of uplink bandwidth of the respective first or other user node.

19. The first user node of claim 13, wherein the computer processor is configured to determine said measure of resource usage by determining at least a measure of resource usage including at least a measure of downlink bandwidth of the first user node.

20. The first user node of claim 13, wherein the computer processor is configured to determine said measure of resource usage by determining at least a measure of CPU usage of the respective first or other user node.

21. The first user node of claim 13, wherein the computer processor is configured to determine said measure of resource usage by determining at least a measure of battery level of the respective first or other user node.

22. The first user node of claim 13, wherein the communication system comprises a VoIP system.

23. The first user node of claim 13, wherein the communication system comprises a peer-to-peer system, and the computer processor is configured to transmit said presence messages based on at least one of peer-to-peer address look-up and peer-to-peer authentication.

24. A communication system implemented over a network, the communication system comprising a plurality of user nodes, comprises:

a computer processor configured to associate a respective presence status indicating an availability of each of the user nodes for communication within the communication system;

the computer processor configured to determine addresses for each of a plurality of others of said user nodes;

the computer processor configured to use the determined addresses to transmit repeated presence messages to each of the plurality of others of said user nodes, each of said presence messages comprising at least one of a request for presence status of the other user nodes, and a notification of presence status of a first user node;

wherein the computer processor is configured to determine a measure of resource usage in relation to the first user node that transmits the presence messages, and is further configured to control a regularity of said repeated transmission of presence messages in dependence on the determined measure of resource usage, such that the repeated transmission of presence messages is dependent on the resource usage of the first user node that transmits the presence messages.

25. A method for use in a communication system implemented over a network comprising a plurality of user nodes, each being associated with a respective presence status indicating an availability of each of the user nodes for communication within the communication network, the method comprising, at each of a first one or more of the user nodes:

transmitting repeated presence messages to each of a plurality of others of said user nodes, each of said presence messages comprising a request for presence status of the other user nodes;

determining a measure of resource usage in relation to at least one of the first transmitting user node and said other user nodes; and controlling a regularity of said repeated transmission of presence messages in dependence on the determined measure of resource usage, such that the repeated transmission of presence messages is dependent on the determined measure of resource usage of the first transmitting user node and said other user nodes.

26. A computer program product for use in a communication system implemented over a network comprising a plurality of user nodes, each of the user nodes being associated with a respective presence status indicating an availability of said each of the user nodes for communication within the communication system; the program comprising code embodied on a non-transitory computer-readable medium and being configured so as when executed on a first one or more of the user nodes to:
- transmit repeated presence messages to each of a plurality of others of said user nodes, each of said presence messages comprising a request for presence status of the other user nodes;
- determine a measure of resource usage in relation to at least one of the first transmitting user node and said other user nodes; and
- control a regularity of said repeated transmission of presence messages in dependence on the determined measure of resource usage, such that the repeated transmission of presence messages is dependent on the determined measure of resource usage of the first transmitting user node and said other user nodes.

27. A first user transmitting node for use in a communication system implemented over a network comprising a plurality of user nodes, each of the user nodes being associated with a respective presence status indicating an availability of said each of the user nodes for communication within the communication system; the first user transmitting node comprising:
- a computer processor configured to transmit repeated presence messages to each of a plurality of others of said user nodes, each of said presence messages comprising a request for presence status of the other user nodes;
- a processing unit is configured to determine a measure of resource usage in relation to at least one of the first user transmitting node and said other user nodes, and is further configured to control a regularity of said repeated transmission of presence messages in dependence on the determined measure of resource usage, such that the repeated transmission of presence messages is dependent on the determined measure of resource usage of the first transmitting user node and said other user nodes.

28. A communication system implemented over a network, the communication system comprising a plurality of user nodes, each of the user nodes being associated with a respective presence status indicating an availability of the user nodes for communication within the communication system; wherein each of a first one or more of the user nodes comprises:
- a computer processor configured to operate in conjunction with a processing unit in order to transmit repeated presence messages to each of a plurality of others of said user nodes, each of said presence messages comprising a request for presence status of the other user nodes;
- wherein the processing unit is configured to determine a measure of resource usage in relation to at least one of the first user transmitting node and said other user nodes, and is further configured to control a regularity of said repeated transmission of presence messages in dependence on the determined measure of resource usage, such that the repeated transmission of presence messages is dependent on the determined measure of resource usage of the first transmitting user node and said other user nodes.

* * * * *